United States Patent [19]
Swanberg

[11] 4,011,446
[45] Mar. 8, 1977

[54] DEVICE FOR PRODUCING A SIGNAL INDICATING THE DIRECTIONAL MOVEMENT REQUIRED TO ACHIEVE FOCUS

[75] Inventor: Melvin E. Swanberg, Claremont, Calif.

[73] Assignee: Xerox Corporation, Stamford, Conn.

[22] Filed: Apr. 18, 1975

[21] Appl. No.: 569,425

[52] U.S. Cl. .............................. 250/201; 250/237 G; 353/101; 356/126
[51] Int. Cl.² ....................... G01J 1/20; G01B 3/00
[58] Field of Search ........... 356/125, 126; 250/201, 250/237 G; 350/46; 353/99, 101

[56] References Cited
UNITED STATES PATENTS

| | | | |
|---|---|---|---|
| 3,421,815 | 1/1969 | Dönitz | 353/99 |
| 3,783,270 | 1/1974 | Kamachi | 356/126 |
| 3,798,449 | 3/1974 | Reinheimer | 250/201 |

Primary Examiner—Vincent P. McGraw
Attorney, Agent, or Firm—James J. Ralabate; Michael J. Colitz, Jr.; Franklyn C. Weiss

[57] ABSTRACT

A light focus sensor having first and second grids comprised of interlaced light transmissive and light reflective portions and a rotating optical modulator comprised of a plurality of alternate light transparent and light opaque portions. The modulator portions are half the size of the reflective portions of the grids and the modulator is positioned in relation to the grids such that the phase relationship between the portions of one grid and the portions of the modulator is 180° different than the phase relationship between the portions of the other grid and the portions of the modulator such that the composite signal passing through the modulator is indicative of the directional movement required to achieve focus.

9 Claims, 10 Drawing Figures

SINGLE CHANNEL DETECTOR OUTPUT

SINGLE CHANNEL BANDPASS
AMPLIFIED SIGNAL

DEVICE FOR PRODUCING A SIGNAL INDICATING THE DIRECTIONAL MOVEMENT REQUIRED TO ACHIEVE FOCUS

BACKGROUND OF THE INVENTION

In microfiche blowback systems it is highly desirable to use a magnification that can be varied readily. This is because various forms of microfiche use different reduction ratios, and also because specific users of the system have various preferences in the blowback magnifications that are utilized. The magnification of the system adheres to the fundamental relationship $$\text{magnification} = d_2/d_1 \qquad 1.$$

where $d_2$ is the image-to-lens length (the long conjugate length) and $d_1$ is the object-to-lens length (the short conjugate length). The lens equation $$1/f = 1/d_2 + 1/d_1 \qquad 2.$$

relates focus to the long and short conjugate lengths. In systems where the focal length ($f$) of the lens is fixed, magnification is often achieved by changing the long conjugate length $d_2$. From equation (2) it is seen that changes in the long conjugate length will affect focus and that to maintain focus such a change will require a corresponding change in the short conjugate length.

Generally, magnification control is achieved by manual control of one of the path lengths $d_1$ or $d_2$ with automatic control of the second path length being maintained. In this type of magnification control of the prior art, the second path length is moved in strict accordance with the lens equation (1), it being assumed in those systems that focus will be achieved if the relationships of the lens equation (1) are maintained. A disadvantage of this type of system is, for example, a lack of compensation for variations, such as temperature expansion or contraction of the support structure for the projection lens or the object. Since at high magnification and low f/numbers, tolerances may be very small between the lens and the object plane, on the order of 0.001 inches, systems which rely solely on the solution of lens equation (1) are not always satisfactory.

In automatic focus systems, such as described in the U.S. Pat. Nos. 2,968,994 and 3,421,815, means are provided to evaluate the focus of an actual image and to control the movement of some element of the optical system to maintain a focus condition once it has been achieved regardless of extraneous movement. These systems, known as optical probe focus servo systems, utilize a light source which projects a target image of high resolution backward through the optical system to the object plane, with the target image reflected from the object being projected back through the image system and reimaged at the target plane. If the long and short conjugate lengths are correct in relation to the optical probe imaging lens focal length, the return image will be superimposed on the target and no focus adjustment need be made. If the conjugate lengths are incorrect, that is, not in accordance with lens equation (1), the condition occurs in which the returned target image is in a defocused condition at the target plane. This condition can be sensed, and used to generate a servo-control signal to effect repositioning of the image plane.

Several problems relate to the auto focus system described in the referenced patents. One problem is that the system only maintains focus after it has been manually set, and that it must be manually set each time magnification is changed. A second problem involves the focus control system, which varies the optical path length between lens and object by direct movement of the object plane. Within the tolerances of the system, this direct movement may be difficult to control. A third problem which exists is stray light, there being no means to differentiate between light arriving at the sensor as a result of a focusing condition and light that arrives at the sensor due to extraneous sources of light such as light which will be scattered in the optical system.

OBJECTS OF THE INVENTION

It is therefore an object of the invention to provide a light focus sensor.

It is a further object of the present invention to provide a light focus sensor which is insensitive to stray light.

SUMMARY OF THE INVENTION

In accordance with the invention, the optical path used for focus sensing is essentially the optical path used for imaging. When a defocused condition is sensed, which may be due to a change in the optical path length of the long conjugate in order to achieve a different magnification, the optical path length of the short conjugate is automatically changed. Changes in the optical path length of the short conjugate are achieved by movement of optical wedges which are located between the projection lens and the object to provide very fine and accurate control of the projection lens-to-object distance. Additional advantages are achieved by using a projection lens which is telecentric.

The focused detection system utilizes two mirror grids with alternate clear (light transparent) and light reflecting portions and a rotating optical modulator which is comprised of spaced opaque and transparent bars of one-half the width of the clear and reflecting portions of the grids. In a slightly defocused system condition, an image of the grid pattern will have a light distribution pattern such that light will pass through the edges of the clear portions of the mirrored grids. The modulator scans across the clear portions and alternately blocks light at the edges of the clear portions and then light at the central sections of the clear portions. This will produce a modulation of the defocused light that is passing through the clear portions. The mirrored grids are displaced relative to the modulator such that the modulation signals produced by each mirrored grid in association with the modulator disk will be 180° out of phase with each other. The composite signal will carry a modulation which has a phase relationship corresponding to the channel which is furthest from focus. The composite signal is demodulated to provide a direct current control signal which is used to drive a motor which in turn drives one of the optical wedges in a direction toward focus.

DETAILED DESCRIPTION OF THE PREFERRED EMBODIMENT

Figure 1:
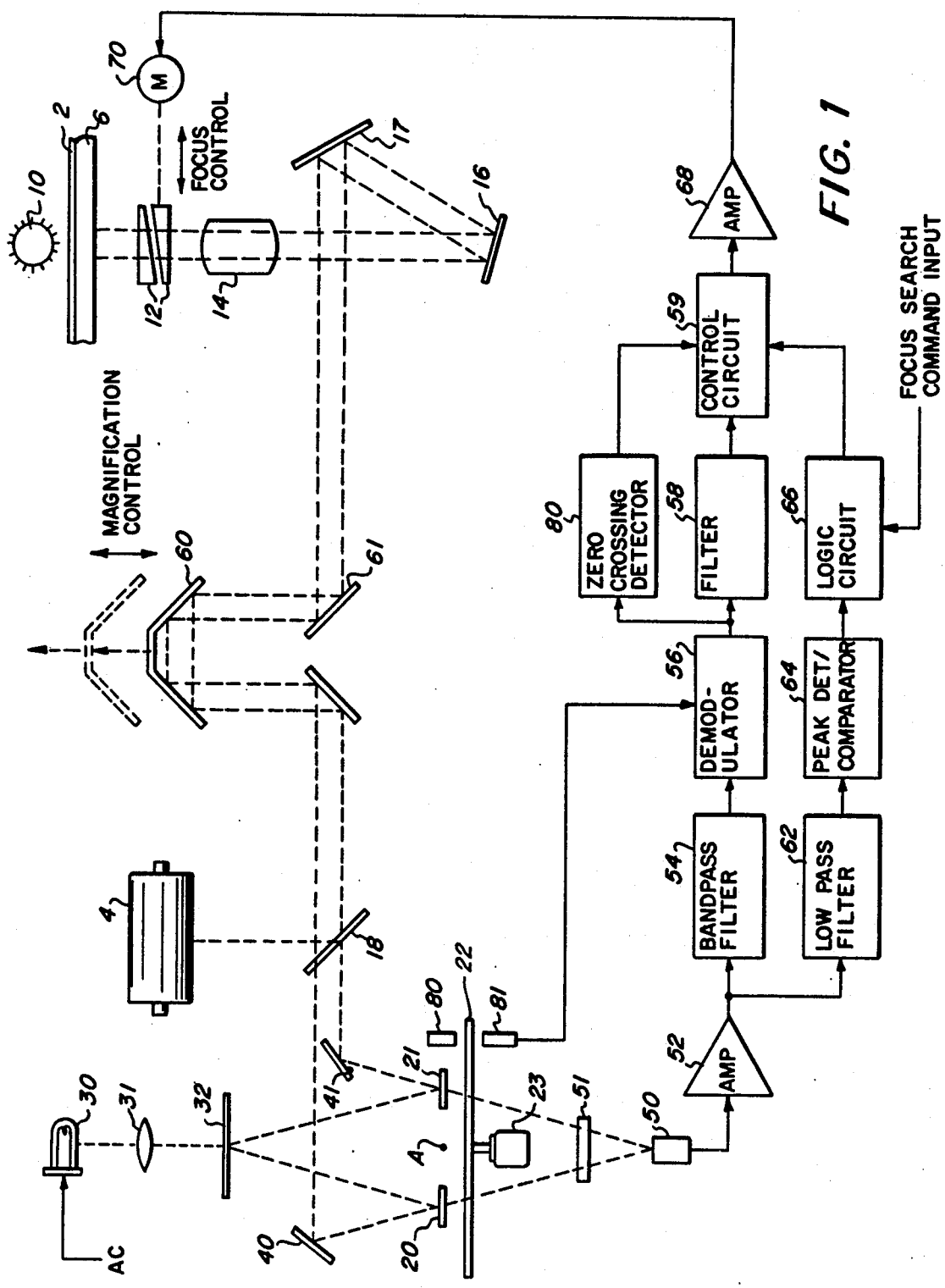
FIG. 1 is a schematic representation of the automatic focus with variable magnification system.
Figure 2:
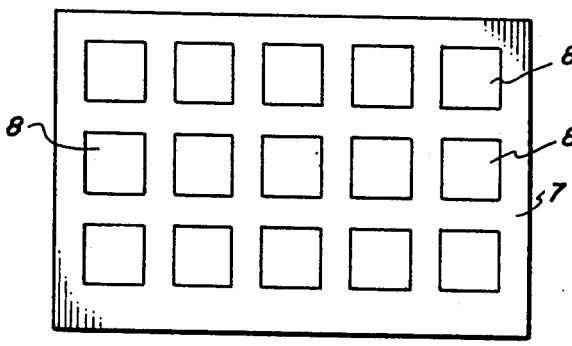
FIGS. 2, 3 and 4 are illustrative plane views of components of the system of FIG. 1.

Referring now to FIG. 1, there is shown a system for projecting an image located at an object plane, such as one of the microimages on microfiche 2, onto a light responsive image plane, which may be the surface of a photoreceptor 4. The microfiche is supported by a clear platen 6 which has on regions of its top surface a light reflecting coating 7 in the form of a grid, as shown in FIG. 2. In lieu of coating 7, a dichroic mirror may be provided over the entire platen glass. The dichroic mirror passes wavelengths used for projecting the microfiche image but reflects wavelengths used for the auto focus probe.

During reproduction, the microimages of microfiche 2 are positioned over the apertures 8 in the coating 7 such that light from a source 10 can be projected through one of the microimages to the photoreceptor 4 via the optical path including the optical wedges 12, the projection lens 14, the mirrors 16 and 17, the trombone mirrors 60 and 61, and the beam splitter 18. By a mechanical arrangement well known in the prior art, one of the trombone mirrors is moved, as shown graphically by the double headed arrow labeled magnification control, to change the distance between the lens 14 and the surface of photoreceptor 4, that is, to change the long conjugate length of the optical path, to thereby change the magnification of the optical projection system in accordance with the reduction rate of the microimages of microfiche 2. The light from source 10 is of a wavelength to which the photoreceptor 4 is responsive, for example, blue light.

Figure 3:
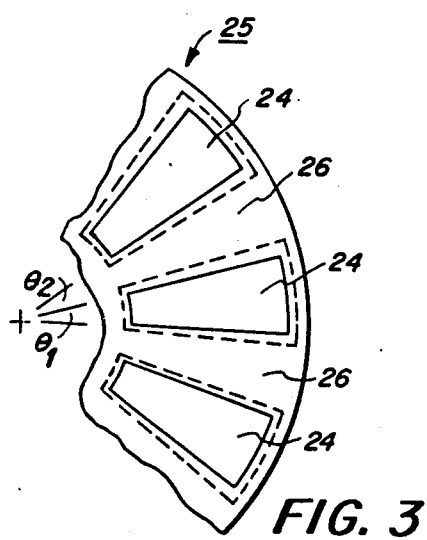
Figure 4:
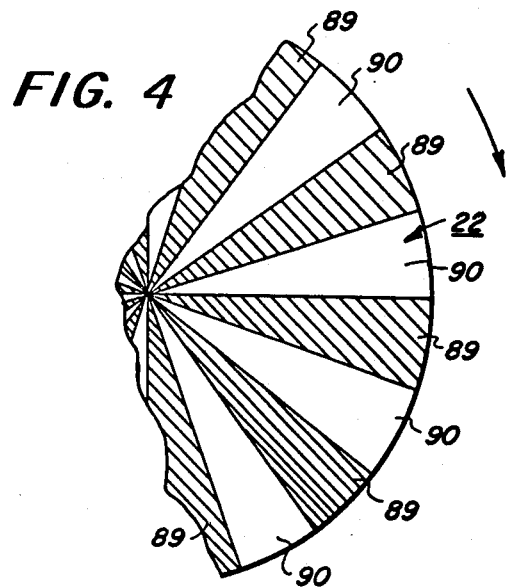

As noted, changing the long conjugate length without changing the short conjugate length will result in a defocused image at the photoreceptor 4. Focus control is achieved by movement of one of the optical wedges which movement changes the short conjugate length. Movement of the optical wedge is controlled by a signal provided by spaced, identical mirrored grids 20 and 21 and adjacent, rotating optical modulator 22 which is driven by a synchronous motor 23. The mirrored grids are preferably disc-shaped and each is comprised of a plurality of light reflective surfaces 24 supported by a clear glass base 25, such that light transparent portions 26 exist between light reflective surfaces 24, as shown in FIG. 3 which is a plane view of a portion of one of the grids. Surfaces 24 are of equal size and preferably in the form of truncated sections of a circle, as shown, with each portion 26 occupying an angular segment of base 25 equal to that angular segment occupied by each surface 24, i.e., $\phi_1 = \phi_2$. The light modulator 22 is preferably disc-shaped and consists of a grid of alternate opaque and light transparent pi-shaped segments 89 and 90, respectively, of equal size, which segments 89 and 90 have twice the spatial freguency (one-half the width) of the reflective surfaces 24 of the mirrored grids. FIG. 4 is a plane view of modulator 22 with only a small percentage of the alternate opaque and transparent segments 89 and 90 shown. The mirrored grid 20 is positioned in relation to the modulator 22 such that it occupies a phase relationship with the modulator segments which is 180° different from the phase relationship that the mirrored grid 21 has with the modulator segments. That is, referring to FIG. 5 which is a view of the grids 20 and 21 looking back through the modulator 22 with the surfaces 24 and the segments 89 and 90 shown as rectangles for ease of illustration, the opaque segments 89 of the modulator 22 obstruct the middle portions of the reflective surfaces 24 of grid 21 when they obstruct only the edge portions of the reflective surfaces 24 of grid 20. This phase relationship will provide, following demodulation, an output signal of one polarity from channel one (the channel including grid 20) and a signal of the opposite polarity from the other or second channel (the channel including grid 21). The composite output signal will indicate the direction in which one of the wedges 12 must be moved to achieve focus.

Each of the mirrored grids 20 and 21 is illuminated via a condenser lens 31 and a beam splitter 32 by light from a source 30 which has a wavelength to which the photoreceptor 4 is not responsive, for example, red light. The mirrored grids form the object or target which is projected by the reflective surfaces 24 back to the reflective coating 7 on the surface of the platen 6. For grid 20, the projection path includes mirror 40, beam splitter mirror 18, trombone mirrors 60 and 61, mirrors 17 and 16, lens 14 and wedges 12, whereas the projection path for grid 21 includes the same elements of the projection path for grid 20 except that it utilizes mirror 41 in lieu of mirror 40. The mirrored grids 20 and 21 are equidistant from a point A which point is the same distance from beam splitter 18 as the surface of photoreceptor 4 is from beam splitter 18. This placement of the grids provides for measurement of the focus condition on either side of the plane of best focus.

Situated on the side of the rotating modulator 22 remote from the grids 20 and 21 is a photodetector 50 which is responsive to light from source 30 and which, due to the orientation of the mirrors 40 and 41, receives light from both channels 1 and 2. The spectral filter 51 blocks light not of the wave length of the light from source 30.

The output signal of the detector 50 is amplified by an amplifier 52 and the amplified signal is supplied to a band pass filter 54 which is tuned to the modulation frequency, that is, for example, filter 54 is tuned to 6 KC when modulator disk 22 is rotated at 60 revolutions per second and has 100 interspersed opaque and transparent sections. The filtered signal is supplied to a demodulator 56 which has a reference signal which is generated when the opaque sections of the rotating modulator 22 block the flow of light from light emitting diode 80 to photodiode 81. In the example specified, the reference signal is a 6 KC signal. The output of the demodulator 56 is supplied to a filter 58 to remove noise, specifically, for the example given, 6 KC modulation noise, with the output of the filter 58 supplied to the control circuit 59.

The output of the amplifier 52 is also supplied to a low pass filter 62 whose band pass is a function of the speed at which the focus control system can drive through focus, which, for the example given, would be less than 10 hertz. The output of the low pass filter 62 is supplied to a conventional peak detector-comparator circuit 64, with the output of the peak detector-comparator circuit 64 being supplied as an input to a logic circuit 66 which also receives a focus search command input signal of the type to be described later. The output of the control logic circuit 66 is supplied as a control signal to control circuit 59. Control circuit 59 and logic circuit 66 are conventional circuits and may be a conventional comparator and electronic switch circuit and a conventional comparator and flip flop, respectively. The output of the control circuit 59 is amplified by amplifier 68 and the amplified signal is supplied to a motor 70 which is coupled to one of the wedges to move the wedge to the right or to the left, as shown by the double headed arrow, to achieve variation of the short conjugate length and hence focus.

Figure 5:
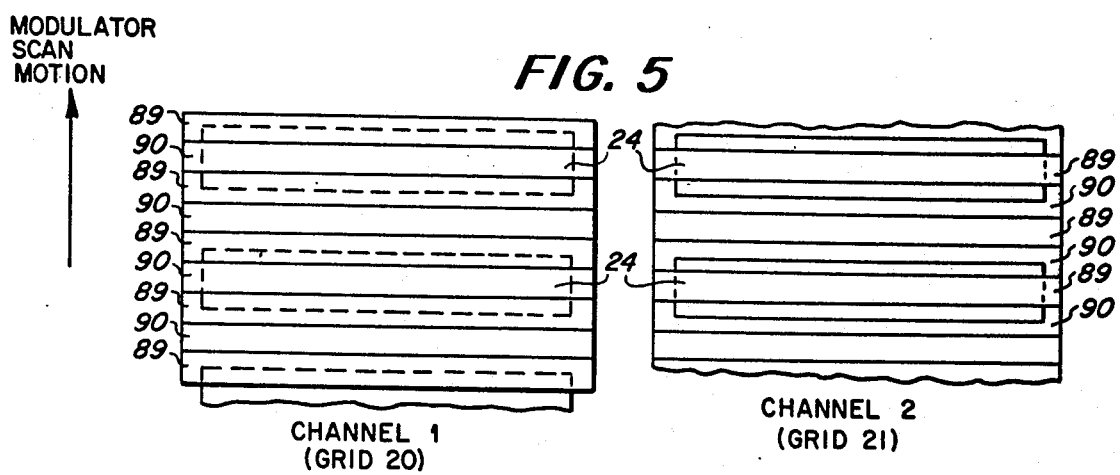
FIG. 5 is a schematic representation of the interaction between components of the system of FIG. 1.

In operation, the mirrored grids 20 and 21, illuminated from the light source 30, form the object or target which is projected through the optical system. Images of the reflective surfaces 24 of grids 20 and 21 are formed by the projection lens 14 at the reflecting surface 7 of the platen 6. This light is then reflected back through the projection lens 14 and mirror system to be reimaged at the source, that is, the mirror grids 20 and 21. If this second image is in focus at the mirrored grids, all reimaged light will be reflected back to the illuminating source 30. If the image is out of focus at the mirrored grids 20 and 21, portions of the light will pass through the light transparent portions 26 of these grids. As noted, the modulator has alternate transparent and opaque portions which opaque portions occupy 50% of the area of light transparent portions 26. Thus, if a uniform illumination passes through the light transparent portions 26, the transmitted light intensity does not vary as the modulator 22 scans across the light passing through light transparent portions 26. As previously stated, an image of the mirror grids 20 and 21 which is in focus will fall superimposed with the mirror grids and no reimaged light will pass through the portions 26. However, in a slightly defocused condition, the reflected image will have a light distribution pattern such that some reimaged light will pass through the portions 26 at the edges thereof as shown in FIG. 3. Referring to FIG. 5, it can be seen that as the modulator 22 scans across the portions 26 (the portions between surfaces 24) the opaque portions 89 of the modulator 22 will alternately block the edges of the portions 26 and then the central portion of the portions 26. In effect, it will produce a modulation of the defocused light that is passing through the portions 26. In addition, the two sensor channels, i.e., grids 20 and 21, have a reflective surface and modulator positional relationship such that when portions 26 of one grid are being blocked by the modulator grids at its edges, the other set of portions 26 of the other grid are being blocked by the modulator grids in the central area thereof. Thus, the defocused light is modulated such that the modulations will be 180° out of phase with each other. If these light levels are of equal amplitude, recombining the two light beams will produce a resultant light beam which is not modulated. This condition implies that the images of both grids 20 and 21 are equally out of focus — a condition which can only exist when the plane of best focus falls at a point which is halfway between the mirrored grids, 20 and 21, that is, at point A. A shift of this focus position one way or the other (either due to an adjustment of the magnification control or due to uncontrolled movement of a system component) will cause the defocused condition at one grid to be reduced and the defocused condition at the other grid to be increased. Under this condition, the modulated level of the light passing through the portions 26 of the other grid will increase. The sum of these two light beams will thus carry a modulation which has a phase relationship corresponding to the channel which is furthest from focus.

This modulated light falls on detector 50 and generates a proportional signal. This signal is amplified by bandpass amplifier 52 which amplifies at the modulation frequency. The amplified signal is then synchronously demodulated using the reference signal which is generated by light emitting diode 80 whose light is modulated by the modulator disk 22 and then detected by detector 81. The demodulated signal is further filtered to remove modulation noise and amplified to provide a positive DC signal when the plane of best focus falls closest to one mirrored grid and a negative DC signal when the plane of best focus falls closest to the other mirrored grid. This DC control signal is used to drive motor 70 which in turn controls the movement of one of the optical wedges 12 across the projection axis. The optical wedges 12 in turn adjust the optical path length between the projection lens 14 and the platen reflective surface 7 causing the plane of best focus to shift back to point "A" located half-way between the two mirrored grids 20 and 21. At this point, signal modulation will be zero, and the motor 70 no longer drives.

In order to best understand the operation of the automatic focus system control circuits, it is best to examine the distribution of light which is reimaged at one of the mirrored grids. This is best done by describing what one would view through a portion 26 of one of the grids, in terms of light intensity and distribution passing through that portion, as the system is focused from one extreme of defocus, through focus, and into the other extreme of defocus. Starting at an extreme defocus condition, the light passing through the portion 26 will have a relatively low intensity. This is due to the fact that image blurr is so extreme that the returned light, the light reflected from surface 7, is distributed over a large area, several times larger than the mirrored grid size. As focus is approached, the area covered by the returned light decreases resulting in an increase of energy which passes through the portion 26. As focus is approached, the total light passing through the portion 26 reaches a peak at which time the light distribution will start to change, getting darker in the central section of the portion 26 and brighter at the edges. Continuing toward focus, this light redistribution will become more apparent, with the total light energy decreasing. When focus is reached, the light passing through the portion 26 is confined to the immediate vacinity of the edge (with the exception of a uniform, unchanging background light caused by scattering). In the focused condition, the total light passing through the portion 26 has reached a minimum. Passing through focus toward the opposite extreme defocus condition, the change in light level and light distribution passes through the phases described above, but in the reverse order.

Figure 6A:
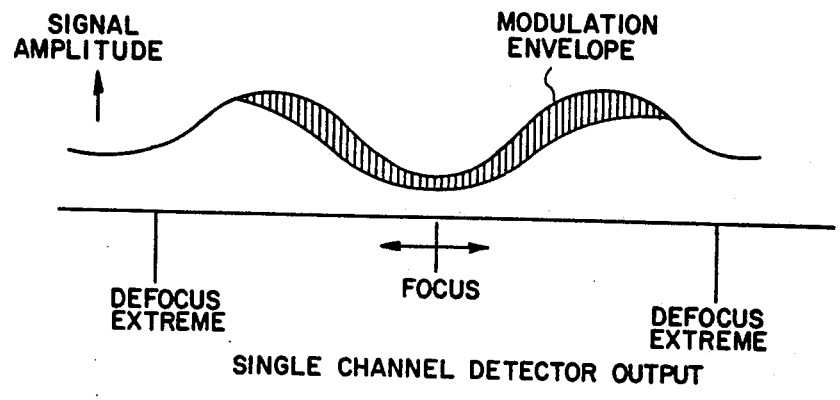
FIGS. 6A and 6B, and 7A, 7B and 7C are waveforms appearing at designated points of the system of FIG. 1.
Figure 6B:
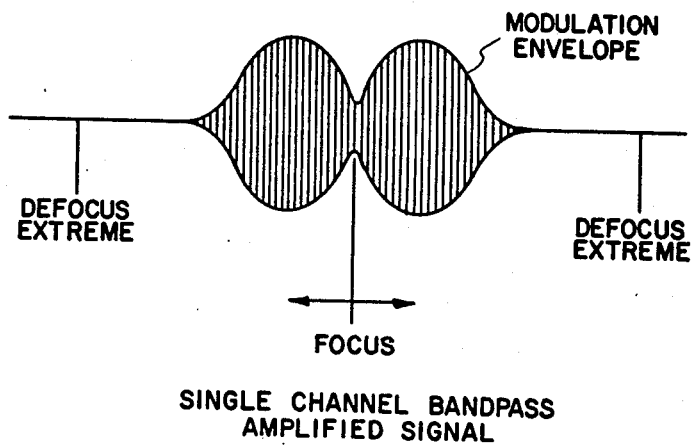

As previously explained, the light modulator 22 consists of a grid of opaque and transparent bars, which have twice the spatial frequency (one-half width) as the portions 26 of the mirrored grids. As the modulator scans across the grid portions 26, light which is distributed near the edges of the portions 26 is modulated, whereas uniform light is not modulated. If the light passing through the portions 26, and through the modulator 22 is detected, and the system is scanned through focus as described above, the single channel detector output signal will appear as shown in FIG. 6A, which, for the example given, has a 6 KC modulation. The output of bandpass amplifier 54, tuned to the modulation frequency, is shown in FIG. 6B. The dc output of the demodulator 56, after filtering, will have a form, which corresponds to the positive or negative envelope shown in FIG. 6B, the polarity being dependent on the phase of the modulation with respect to the phase of the demodulator reference signal.

Figure 7A:
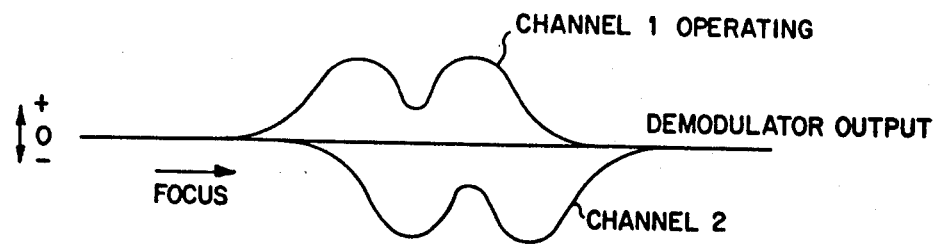
Figure 7B:
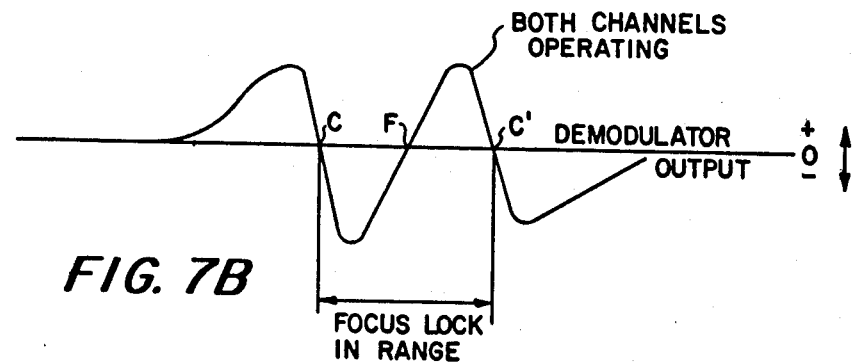
Figure 7C:
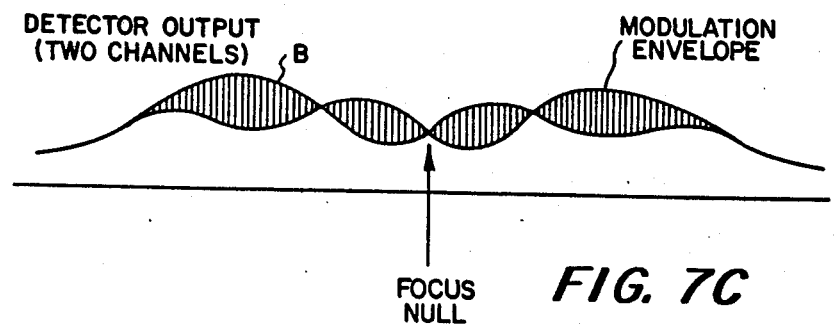

In the above description only one of the mirrored grids, and its resultant signal, have been considered. The second channel operates in an identical manner, with the exception that the focused condition is offset (due to a different optical path length) and the modulation phase is 180° different, resulting in the opposite polarity output. If the output of the demodulator is first plotted with only one optical channel operating, then plotted with only the other channel operating, the two plots will appear as shown in FIG. 7A. When both channels are operating, the output of the demodulator will appear as shown in FIG. 7B. Referring to FIG. 7B, it can be seen that there are three intervals of the signal as the system is moved through a wide range of focus. The proper focus condition is located at the central crossover point "F." The focus control motor 70 is therefore connected such that a positive output from the demodulator 56 will drive the focus toward the left (referring to FIG. 7B) while a negative signal would drive the focus toward the right. It can thus be seen from FIG. 7B, that if the system has been preset within the "lock in" range, the system will automatically focus to the best focus condition; however, if the system has been preset to a point outside the lock in range, the system will drive away from the point of best focus. Accordingly, the system must determine when it is focused within the lock in range. This determination is made by means of the combination of the filter 62, peak detector-comparator 64, and logic circuit 66. As previously mentioned, the total light transmission through the portions 26 of the grids 20 and 21 reaches a peak on either side of focus. This condition provides a means to locate the lock in range, as shown in FIG. 7C which is the unprocessed signal from detector 50 with both channels operative. As can be seen, the amplitude of the signal reaches a peak outside the lock in range, and passes through a minimum at the focus null.

The signal 7C is processed to determine the focus lock in range. When the system is in a standby condition, such as when changing microfiche, the focus control is driven to one extreme position (by means not shown). Initiation of the operate cycle supplies the focus search command signal to control logic 66 and causes the focus control to scan toward the opposite extreme focus condition. The detector circuit 64, monitoring the signal of FIG. 7C, generates a lock in control signal when the signal passes through a peak, such as peak B of the signal of 7C. In the meantime, a zero crossing detector 80 monitors the demodulated signal 7B, i.e., the output of demodulator 56, and generates a logic signal when the zero crossing point C is reached. These logic signals, in turn, control circuit 59 such that the signal of 78 is passed by the control circuit 69 only when the signal of FIG. 7B has a value between zero crossing points C and C'. Once within the lock in range, the system maintains focus by virtue of the closed loop servo control.

An important feature in the proposed system utilizes the optical wedges 12 which provide the means to vary one of the optical path lengths. Since it is necessary to provide a very fine and accurate control of the lens-to-object distance, any mechanism which moves the lens or film plane must be smooth operating, free of backlash, and also free of movement which may be orthogonal to the optical axis. The optical wedges provide this capability. First, movement of the wedges (as a pair) in a direction orthogonal to the optical axis, or parallel with the optical axis, will not cause a change of focus or displacement of the image. It is only the relative motion of one wedge with respect to another, which causes an effective change in the glass thickness placed in the optical path. The ration of glass thickness variation to actual wedge movement is proportional to the wedge movement times the sine of the wedge angle. Also, the variation in path length is proportional to the effective glass thickness multiplied by the difference of the index of refraction of the glass and the external medium (air). The mechanical and optical advantage (between wedge motion and optical path length change) reduces the sensitivity of mechanical error. With a wedge angle of about 6°, and an index of refraction of about 1.5, this mechanical advantage is 36 to 1. Thus, a 0.0001 inch change in the optical path length (through the wedges) is achieved by a 0.0036 inch relative motion of two wedges. This is a tolerance which can be easily maintained and controlled.

Another aspect of the optical system which provides improvement is the use of a projection lens 14 which is telecentric. The characteristic of the telecentric lens which is important here is that the principle rays at the microfiche side of the lens are all parallel and normal to the fiche's surface. This characteristic allows slight variations in the focus which may be within the depth of focus, but would cause variations of magnification with other types of lenses. Since it is intended that the automatic focus system be operated during the print cycle, the autofocus system will be continually operating, and although maintaining focus within the depth of focus, may actually vary slightly causing minor but noticeable changes in the magnification if a non-telecentric lens were used. A second characteristic of a telecentric lens is that it is less sensitive to color aberrations caused by the various thicknesses of the glass path. This allows the use of the wedges for focus control. A third characteristic of the telecentric lens which makes it more suitable for use with the type of focus described, is that the focus probe can be placed off axis in the optical system without vignetting on the return path. With a telecentric lens, the principle ray incident thereon is refracted in such a manner that it strikes the other plane normal to the surface. The reflected ray thus re-enters the lens, and vegnetting does not occur.

It should be noted that the focus detector system utilizes a single light source which is split into two optical paths of differing lengths. This provides for measurement of focus condition on either side of the plane of best focus. The light returning from the platen via the two optical paths is recombined and imaged on a single detector. It is this concept, the use of both a single light source and a single detector, which makes the system insensitive to changes in light intensity and changes in detector sensitivity.

As noted, the system is extremely insensitive to stray light. The ability of the system to discriminate between the light energy of the image and stray light due to forward scatter results in a much improved sensitivity, as the percentage of light passing through the portions 26 due to defocus is actually only a small percentage of the total light due to the high level scattering in such system. It has been found that a slight change in focus will produce only a one percent or two percent change in the total light passing through the grid portions 26. This small change could not be reliably detected without the modulator technique as described. As previously stated, the change in light level due to focus conditions is distributed at the edges of the portions 26, and it is only this light that is being modulated. The frequency selective amplification, and synchronous detection of the modulation signal, provide a means to extract the desired signal from the noise. Tests indicated that this system has an ability to detect the position of best focus with a precision which is an order of magnitude greater than depth of focus of the projection system.

Another aspect of the optical system which provides improvement is that the optical probe focus system light path follows through the optical path used for projection and therefore does not require manual focus adjustment when magnification changes are made.

I claim:

1. A device for producing a signal for controlling the focus of a lens in an optical projection system comprising:
    a first stationary member having a plurality of light reflecting surfaces distributed thereon with light transparent portions between said light reflecting surfaces of said first member,
    a second stationary member having a plurality of light reflecting surfaces distributed thereon with light transparent portions between said light reflecting surfaces of said second member,
    means for illuminating said first and second stationary members,
    means for forming an image of the light reflecting surfaces on said first and second stationary members through said lens at a remote location, the image formed at said remote location being reimaged through said lens on said light reflecting surfaces, the reimaged light being reflected back to said illuminating means if the reimaged light is in focus at said light reflecting surfaces,
    a rotating optical modulator comprised of a plurality of alternate light opaque and light transparent portions, said rotating optical modulator being positioned adjacent both said first and second stationary members, the plane of said optical modulator being equidistant from the plane of said light reflecting surfaces of said first and second stationary members,
    means for rotating said modulator at a substantially constant speed, and
    detector means positioned adjacent said optical modulator for detecting that portion of the reimaged light transmitted through the light transparent portions of said first and second stationary members and the light transparent portions of said optical modulator when said reimaged light is not in focus at said light reflecting surfaces.

2. The light focus sensor of claim 1 wherein said first and second stationary members are each comprised of a light transparent disc which supports said light reflecting surfaces on a surface thereof.

3. The light focus sensor of claim 1 wherein said light reflecting surfaces of said first and second members are in the form of truncated sections of a circle, and said portions of said modulator are pi-shaped segments of a circle.

4. The device as defined in claim 1 wherein reimaged light not reflected by said light reflecting surfaces on said first and second stationary members are modulated by said optical modulator whereby the modulated reimaged light produced by said first stationary member is 180° out of phase with the modulated reimaged light produced by said second stationary member.

5. The device as defined in claim 4 wherein the modulated reimaged light produced by said first and second stationary members are combined in said detector.

6. The device as defined in claim 5 wherein the detector does not generate said signal when the amplitudes of the modulated reimaged light produced by said first and second stationary members are equal.

7. The device as defined in claim 5 wherein the amplitudes of the modulated reimage light produced by said first and second stationary members are unequal, the detector generating said signal in response thereto which is utilized to impart movement to an optical member in said optical projection system until the amplitudes of the modulated reimaged light produced by said first and second stationary members becomes equal, the lens focus thereby being controlled.

8. The device as defined in claim 1 wherein said light reflecting surfaces of said first and second stationary members are of equal size with each of said portions of said modulator being one-half the size of each of said light reflecting surfaces of said first and second stationary members, said first and second members being positioned in relation to said modulator such that said light reflecting surfaces of said first member have a phase relationship with said portions of said modulator which is 180° different than the phase relationship that said light reflecting surfaces of said second member have with said portions of said modulator.

9. The device as defined in claim 1 wherein said first and second stationary members are positioned in relation to said modulator such that said opaque portions of said modulator obstruct light passing through only the middle portion of each of said light transparent portions of said first member while said opaque portions of said modulator obstruct light passing through only the edge portions of each of said light transparent portions of said second member.

* * * * *